(12) United States Patent
Pham et al.

(10) Patent No.: US 12,547,807 B1
(45) Date of Patent: Feb. 10, 2026

(54) DIGITAL CIRCUIT BOARD MAP FOR MONITORING INTEGRATED CIRCUIT CHIPS

(71) Applicant: Auradine, Inc., Santa Clara, CA (US)

(72) Inventors: Diana Pham, Santa Clara, CA (US); Matangi Vaidyanathan, Santa Clara, CA (US); Sairam Jalakam Devarajulu, Santa Clara, CA (US); Marshall Long, Sugarland, TX (US); Sridhar Chirravuri, Sunnyvale, CA (US)

(73) Assignee: Auradine, Inc., Santa Clara, CA (US)

( * ) Notice: Subject to any disclaimer, the term of this patent is extended or adjusted under 35 U.S.C. 154(b) by 0 days.

(21) Appl. No.: 19/187,411

(22) Filed: Apr. 23, 2025

(51) Int. Cl.
| | |
|---|---|
| *G06F 30/337* | (2020.01) |
| *G06F 3/04812* | (2022.01) |
| *G06F 3/04817* | (2022.01) |
| *G06F 111/02* | (2020.01) |
| *G06F 115/06* | (2020.01) |
| *G06F 119/06* | (2020.01) |
| *G06F 119/08* | (2020.01) |

(52) U.S. Cl.
CPC ........ *G06F 30/337* (2020.01); *G06F 3/04812* (2013.01); *G06F 3/04817* (2013.01); *G06F 2111/02* (2020.01); *G06F 2115/06* (2020.01); *G06F 2119/06* (2020.01); *G06F 2119/08* (2020.01)

(58) Field of Classification Search
USPC .......................................... 716/132
See application file for complete search history.

(56) References Cited

U.S. PATENT DOCUMENTS

2022/0147297 A1* 5/2022 Markeci ................ G06F 3/14
2023/0037377 A1* 2/2023 Fresa .................. G06F 1/206

* cited by examiner

*Primary Examiner* — Bryce M Aisaka
(74) *Attorney, Agent, or Firm* — Fish & Richardson P.C.

(57) ABSTRACT

A system that includes a control system communicatively coupled to at least one computation hardware asset through one or more networks. The control system is configured to present on a user interface, a digital map including icons indicating individual IC chips on a circuit board of the computation hardware asset. The icons are arranged on the digital map corresponding to physical locations of the individual IC chips. The control system is further configured to: receive a value of a parameter of at least one of the individual IC chips via the one or more networks; based on the received value, select a category for the received value from a group of possible categories; and present, associated with the icon of the at least one of the individual IC chips on the digital map, information indicating the category for the received value.

21 Claims, 5 Drawing Sheets

DIGITAL CIRCUIT BOARD MAP FOR MONITORING INTEGRATED CIRCUIT CHIPS

TECHNICAL FIELD

The present disclosure generally relates to digital circuit board map for monitoring integrated circuit (IC) chips.

BACKGROUND

A large number of hardware assets (e.g., computers that perform computation tasks for cryptographic operations, such as mining cryptocurrencies, or for large language models, among other applications) can be aggregated together and managed in a common system.

SUMMARY

Implementations of the present disclosure are generally directed to systems and methods for digital circuit board map for monitoring IC chips performing computation tasks such as mining cryptocurrencies. The digital circuit board map of this disclosure provides a digital representation showing physical locations of individual IC chips (referred to as chips or ICs) on a circuit board of a computing system. In some implementations, the map displays color-coded representations of measured parameters for each chip. For example, temperature, frequency, and voltage at individual chips can be measured during the computation tasks, and corresponding information can be visually presented on the digital circuit board map. In some implementations, this map can be used an intuitive visualization tool for the purpose of monitoring various computation tasks. For example, in cryptocurrency mining context, a mining system user can effectively monitor the mining operation at individual IC chip level, detect any errors or faulty chips, and quickly diagnose and address issues.

An implementation of this disclosure provides a system that includes a control system communicatively coupled to at least one computation hardware asset through one or more networks. The control system is configured to perform operations including presenting on a user interface, a digital map including icons indicating individual IC chips on a circuit board of the computation hardware asset. The icons are arranged on the digital map corresponding to physical locations of the individual IC chips on the circuit board. The control system is further configured to receive a value of a parameter of at least one of the individual IC chips via the one or more networks. The control system is further configured to, based on the received value, select a category for the received value from a group of possible categories. The control system is further configured to present, associated with the icon of the at least one of the individual IC chips on the digital map, information indicating the category for the received value.

In an aspect, the at least one computation hardware asset is configured to perform cryptocurrency mining operations.

In an aspect, combinable with any other aspect, the information is presented using a color-coded representation, and each of the possible categories has a designated color code.

In an aspect, combinable with any other aspect, the control system is further configured to adjust the parameter for the at least one of the individual IC chips during a computation performed by the at least one computation hardware asset.

In an aspect, combinable with any other aspect, the parameter is a first parameter, and the control system is further configured to receive a value of a second parameter and a value of a third parameter of the at least one of the individual IC chips. The control system is further configured to, based on the received value of the second parameter, select a category for the received value of the second parameter from a second group of possible categories. The control system is further configured to present, associated with the icon of the at least one of the individual IC chips on the digital map, information indicating the category for the received value of the second parameter. The control system is further configured to, based on the received value of the third parameter, select a category for the received value of the third parameter from a third group of possible categories. The control system is further configured to present, associated with the icon of the at least one of the individual IC chips on the digital map, information indicating the category for the received value of the third parameter.

In an aspect, the first parameter is temperature, the second parameter is frequency at which the at least one of the individual IC chips is operated, and the third parameter is voltage that is applied to the at least one of the individual IC chips.

In an aspect, combinable with any other aspect, the digital map includes a hover tooltip to present, when a user hovers a cursor over one of the icons on the digital map, the received value of the parameter for the one of the individual IC chips corresponding to the selected icon.

Another implementation of this disclosure provides a system that includes cryptographic hardware assets configured to perform hashing operations. The cryptographic hardware assets include hashboards, where at least one of the hashboards includes Application-Specific Integrated Circuit chips (ASIC chips). The cryptographic hardware assets further include a control system remote from the cryptographic hardware assets and communicatively coupled to the cryptographic hardware assets through one or more networks. The control system is configured to, when a user selects one of the hashboards on a user interface, present on the user interface, a digital map including icons indicating the ASIC chips on the selected hashboard. The icons are arranged on the digital map corresponding to physical locations of the ASIC chips on the hashboard. The control system is further configured to receive values of at least three parameters of at least one of the ASIC chips of the selected hashboard of the cryptographic hardware assets via the one or more networks. The control system is further configured to, based on the received values, select a category for each of the received values from groups of possible categories. The control system is further configured to present, associated with the icon of the at least one of the ASIC chips on the digital map, information indicating the categories for the received values.

In an aspect, the at least three parameters include temperature, frequency, and voltage.

In an aspect, the at least three parameters further include chip efficiency calculated based on the temperature, the frequency, and the voltage.

In an aspect, combinable with any other aspect, each of the ASIC chips has a unique ID, and each of the icons presents the unique ID of the corresponding ASIC chip.

In an aspect, combinable with any other aspect, at least the one of the hashboards includes at least 100 ASIC chips.

In an aspect, combinable with any other aspect, the information is presented individually for each of the at least three parameters.

In an aspect, combinable with any other aspect, the information is presented using color-coded representations, where each one of the possible categories has a designated color code within the corresponding group.

Another implementation of this disclosure provides a method that includes presenting a digital map on a user interface. The digital map includes icons indicating individual integrated circuit (IC) chips on a circuit board of a computation hardware asset. The icons are arranged on the digital map corresponding to physical locations of the individual IC chips on the circuit board. The computation hardware asset is configured to perform computation tasks. The method further includes obtaining a value of a parameter of at least one of the individual IC chips. The method further includes, based on the received value, selecting a category for the received value from a group of possible categories. The method further includes presenting, associated with the icon of the at least one of the individual IC chips on the digital map, information indicating the category for the received value using a color-coded representation.

In an aspect, the method is performed using a control system communicatively coupled to the computation hardware asset through one or more networks.

In an aspect, combinable with any other aspect, the computation hardware asset includes a cryptographic hardware asset configured to perform cryptocurrency mining operations, and the method is performed during the cryptocurrency mining operations.

In an aspect, the method further includes, during the cryptocurrency mining operations, adjusting the parameter for the at least one of the individual IC chips.

In an aspect, combinable with any other aspect, the method further includes, when a user hovers a cursor over an icon on the digital map, displaying the received value of the parameter for one of the individual IC chips corresponding to the selected icon.

In an aspect, combinable with any other aspect, the parameter is temperature. The method further includes obtaining a value of frequency and a value of voltage, the frequency and the voltage being those of the at least one of the individual IC chips. The method further includes, based on the received value of the frequency, selecting a category for the received value of the frequency from a second group of possible categories. The method further includes presenting, associated with the icon of the at least one of the individual IC chips on the digital map, information indicating the category for the received value of the frequency. The method further includes based on the received value of the voltage, selecting a category for the received value of the voltage from a third group of possible categories. The method further includes presenting, associated with the icon of the at least one of the individual IC chips on the digital map, information indicating the category for the received value of the voltage.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Distributed computing tasks, such as cryptocurrency mining or parallel computations for artificial intelligence (AI) tasks, may rely on control and management of large numbers of computing devices, each of which may itself include multiple independently-operating IC chips. Collecting and presenting the large amounts of data that may be generated during these tasks presents technical challenges. Performance of the computing tasks may consume a large amount of electricity and may, absent specific control, violate electrical grid regulations or otherwise impair grid operation. Further, performance may be improved when computing devices can be controlled based on different priorities or limits, and when users can easily change configurations for groups of computing devices. Tracking and diagnosing issues with the individual IC chips in computation tasks can be time-consuming and prone to errors. Existing monitoring solutions often fail to present real-time data in an easily accessible and actionable format, making troubleshooting more difficult and prolonging the resolution of issues. Thus, cost-effective, real-time monitoring of individual IC chips and timely detection of errors and operational issues at chip level may be desired.

Various aspects of this disclosure describe digital circuit board map as a visualization tool for one or more computation hardware assets. In some implementations, using the digital map of this disclosure, it is possible to perform chip-level diagnosis of mining operation by a cryptographic hardware asset. In general, the large number of chips in the cryptographic hardware asset complicates the process of tracking and diagnosing issues during mining operations. The lack of an intuitive visualization tool can prevent a user of the mining system from quickly identifying underperforming or faulty chips or other abnormal behavior, leading to increased downtime and inefficient resource allocation.

In various implementations, the digital circuit board map of this disclosure addresses this issue and improve the operation of computation tasks. In some implementations, the digital map of this disclosure can be applied in cryptocurrency mining operations. Although implementations in the cryptomining applications are described in this disclosure, the digital map can be applied in other distributed computing tasks such as AI tasks.

The use of digital map enables presenting status of the individual IC chips in a user-friendly visualized format, allowing the user to quickly monitor and detect any issues at the individual chip level. In various implementations, the digital reproduction of physical arrangement of the individual IC chips integrated with color-coded representation of parameter statuses (e.g., temperature, frequency, and voltage) can significantly improve the troubleshooting efficiency and helps maintain optimal mining performance. For example, based on the measured value of temperature at individual chip level, a health condition (e.g., normal, warning, and too high) of the measured temperature can be displayed for individual IC chips on the digital map with different colors (e.g., green, yellow, and red).

In the following, the concept of digital circuit board map is described referring to FIG. 1-4. An example design of a mining structure including a cryptographic hardware asset with a network management system is described referring to FIG. 5. An example process flow of the method of presenting a digital map of a circuit board of a computation hardware asset is described in FIG. 6.

Figure 1:
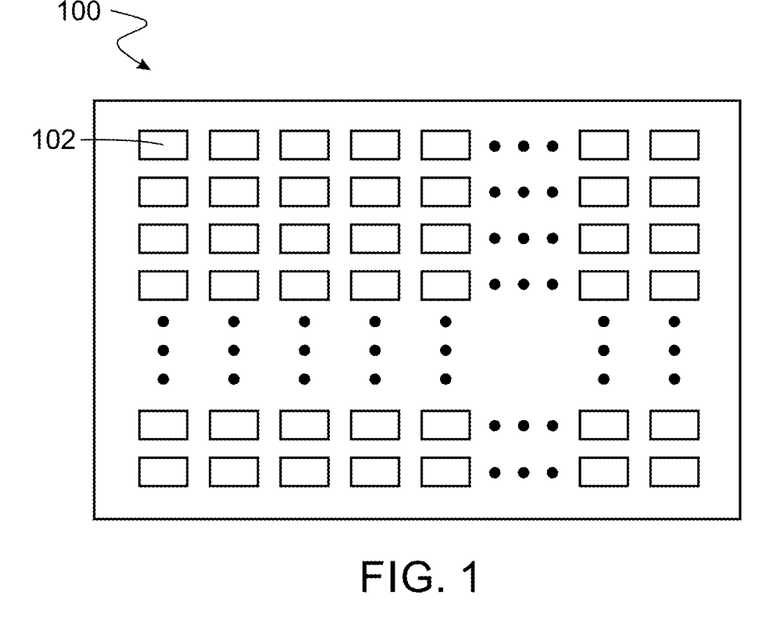
FIG. 1 shows a schematic of a circuit board of a computation hardware asset having numerous IC chips.

FIG. 1 illustrates a schematic of a circuit board 100 of a computation hardware asset having numerous chips 102. In some implementations, the computation hardware asset can be a cryptographic hardware asset (also referred to as "miner"). As used herein, a cryptographic hardware asset refers to any computer, miner, or electronic circuit that is configured to perform a cryptographic hashing operation. For example, the cryptographic hashing operation can be a cryptocurrency mining operation, and this disclosure describes the cryptographic hardware assets in that context, without loss of generality. For example, in some implementations the cryptographic hardware assets can performing hashing calculations, or other cryptographic calculations, which need not be associated with a cryptocurrency.

In some implementations, the computation hardware asset is configured to perform machine learning computations, such as matrix multiplication for training and/or inference, e.g., for a large language model (LLM) or a generative AI model. Training and/or inference processes can include parallel, independent computations that are suitable for parallel performance by multiple IC chips in one or more computing devices. For example, AI/ML training and/or inference can be parallelized through data parallelism, model parallelism, pipeline parallelism, tensor parallelism, and/or other suitable methods. The computation hardware asset can be configured to perform computations based on this parallelization. For example, the computation hardware asset can be configured to perform AI/ML computations that have been parallelized using systolic array methods, pipelining, and/or the other suitable methods.

In various implementations, each computation hardware asset includes one or more circuit boards. In some implementations, one or more circuit boards include multiple IC chips 102. For example, the IC chips 102 can include application-specific integrated circuits (ASICs). In some implementations, the IC chips 100 can be of any one or more suitable types, such as a general-purpose processor chip, a field-programmable gate array (FPGA) chip, a neural processing unit (NPU), etc.

While FIG. 1 only illustrates one circuit board, the computation hardware asset can also include a computer processing unit (CPU) for providing instructions to the IC chips 102 to perform the computation tasks, e.g., hashing operations, as well as for performing other tasks. In some implementations, the other tasks include those related to the mining operation, e.g., arithmetic and logic operations. As further described below, the computation hardware asset can be controlled by a remote network management system via one or more networks.

As illustrated in FIG. 1, the chips 102 can be arranged in a grid layout, with each chip positioned regularly in rows and columns for optimal organization and accessibility. In some implementations, the circuit board 100 includes at least 100 chips 102, e.g., from about 100 to about 200, from about 200 to about 300, or more than 300 chips 102.

In various implementations, the IC chips 102 can be individually controlled for a parameter, such as frequency or computation rate. However, the large number of chips per circuit board in an enclosure often makes it challenging to accurately monitor the chip performance and timely diagnose issues during mining operations. In various implementations, a digital circuit board map of this disclosure can eliminate or mitigate this challenge by offering an intuitive visualization tool with color-coded representations of parameter status (e.g., health condition) of various parameters such as temperature, frequency, and voltage.

Figure 2:
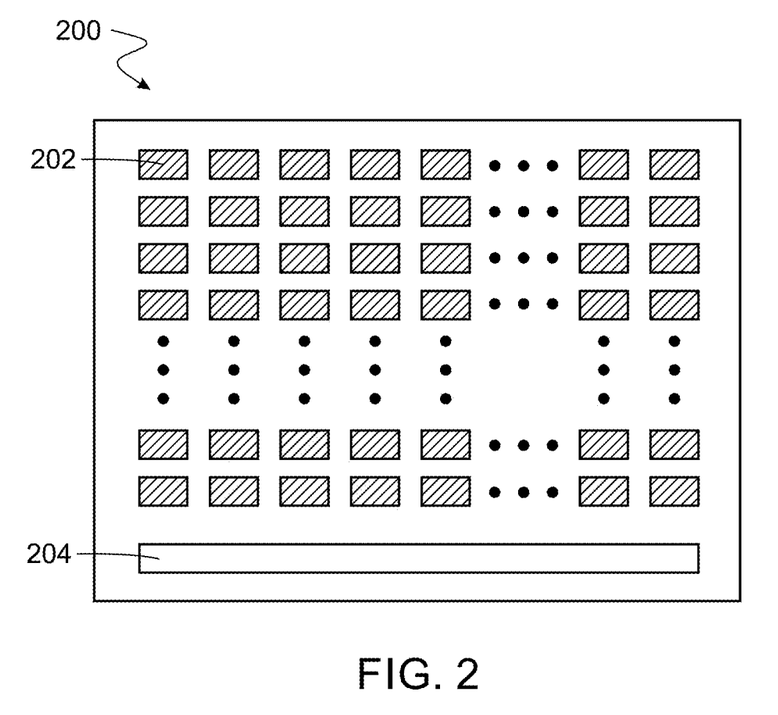
FIG. 2 shows a schematic of a digital map that represents the physical locations of the IC chips of the circuit board of FIG. 1.

FIG. 2 shows a schematic of a digital map 200 that represents the physical locations of the IC chips 102 of the circuit board 100 of FIG. 1. The digital map 200 is generated to render icons 202 for the individual IC chips arranged on the digital map such that their layout corresponds to the physical locations of the individual IC chips 102 on the circuit board 100. The digital map 200 can be configured to be displayed on a user interface as a visualization tool to inform the user about the current parameter status for the individual IC chips 102. For example, the parameter status can include information about a health condition of the individual IC chips 102. In various implementations, the parameter status is presented using color-coded representations. Examples of color-coded representation at chip level will be further described below referring to FIG. 3.

Figure 3:
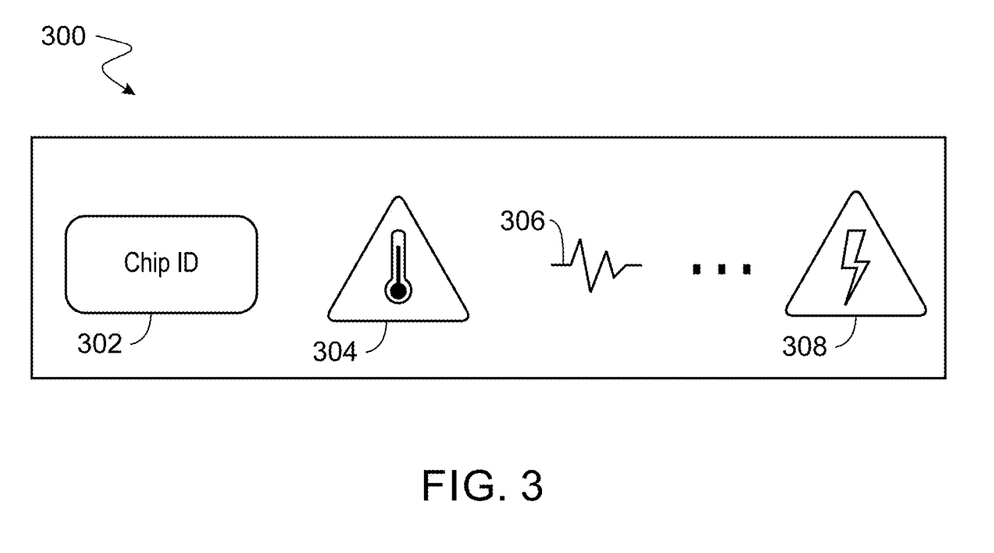
FIG. 3 shows a schematic of status indicators for multiple parameters of individual IC chips on a digital map.

In FIG. 3, a status indicator 300 corresponds to one of the icons 202 of FIG. 2. In various implementations, the individual IC chips 102 are provided with unique identifications (IDs), and the status indicator 300 can present a chip ID 302 of the corresponding chip. The status indicator 300 can further present one or more parameter statuses. Parameter status refers to a category of value of a parameter, e.g., a parameter range, which can be selected from a group of possible categories (ranges) of values. In some implementations, the parameters to be measured can include chip temperature, frequency at which the chip is being operated, and voltage that is applied to the chip. Three different icons (304, 306, and 308) can be used to indicate each health condition, respectively.

In various implementations, the parameter status includes information indicating a health condition of the measured parameter. In this disclosure, health condition of a parameter refers to a level of norm for the range of the parameter during a process such as mining operation. In various implementations, based on the measured value of the parameter, e.g., temperature, and a classification standard, a health condition, e.g., normal, warning, and abnormal, can be assigned to the individual IC chip that is measured for the parameter. The categories indicating health condition can be color-coded, e.g., green, yellow, and red, respectively, and the designated color can be used to display the icons 304, 306, or 308. In some implementations, three or more colors can be used for color coding. Accordingly, the selected category of parameter status can be presented with a designated color as associated with the icon of the at least one of the individual IC chips on the digital map.

In various implementations, this color-coded representation can be used as a substitute for displaying the actual measured value of the parameter itself. The color-coded representation can allow the user to quickly diagnose and address issues at the chip level without manually reading and analyzing the parameter values. This method can significantly improve troubleshooting efficiency and helps maintain optimal mining performance.

In various implementations, the color-coding and other aspects of displaying the health condition can be selected to comply with Web Content Accessibility Guidelines (WCAG) by the World Wide Web Consortium (W3C). This adherence to the WCAG ensures the digital map 200 is accessible to people with disabilities.

In some implementations, in addition to use of different colors, blinking or flashing can also be used to indicate certain health conditions to alert the user.

While the above implementations described referring to FIG. 3 involve three parameters, the number of parameters to be included in the digital map 200 is not limited. In some implementations, for example, chip efficiency can be included as an additional parameter. The chip efficiency can be determined during the computation tasks using measured temperature, frequency, and voltage. Another health condition can be assigned to each of the individual chips based on the chip efficiency and displayed another color-coded representation on digital map 200.

Referring back to FIG. 2, the digital map 200 can further include additional elements for improving the user experience. For example, in some implementations, a legend 204 can be provided to indicate the categories and meaning of the color codes for each parameter, e.g., green for 25° C. to 49° C.

In various implementations, the health condition can also include additional information. For example, the additional information can include whether the chip is powered on or not. Further, the digital map 200 can also include the information about the presence/absence of one or more chips on the circuit board.

In some implementations, the digital map 200 is configured to indicate a temperature range from about −50° C. to about 120° C. In some implementations, the digital map 200 is configured to indicate a frequency range from about 0 Hz to about 1.2 MHz. In some implementations, the digital map 200 is configured to indicate a voltage range from about 0 V to about 10 V.

Further, the digital map 200 can be generated for each circuit board, and in some implementations, one digital map can be displayed on the user interface at a time. In such cases, the dashboard on the screen can include a tab to switch between different digital maps of circuit boards.

Figure 4:
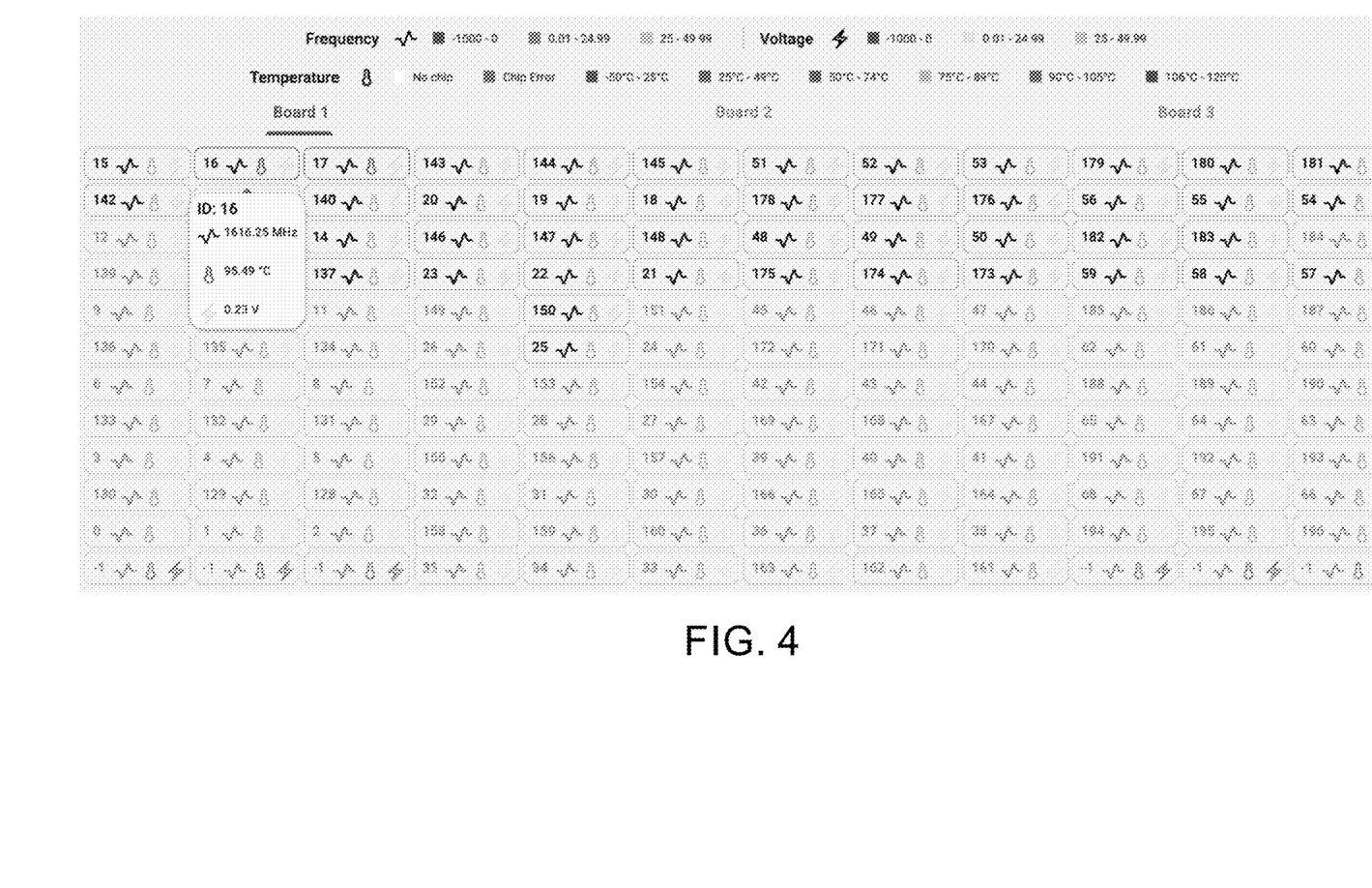
FIG. 4 shows a digital map displayed on a user interface.

In various implementations, the digital map 200 can be interactive with a hover tooltip. For example, the hover tooltip can be configured to display one or more values of the parameters for a selected chip when a user hovers a cursor over the selected chip on the digital map. FIG. 4 shows a digital map displayed on a user interface. In FIG. 4, a pop-up is shown for the chip ID 16, displaying the measured values of three parameters of frequency, temperature, and voltage.

Figure 5:
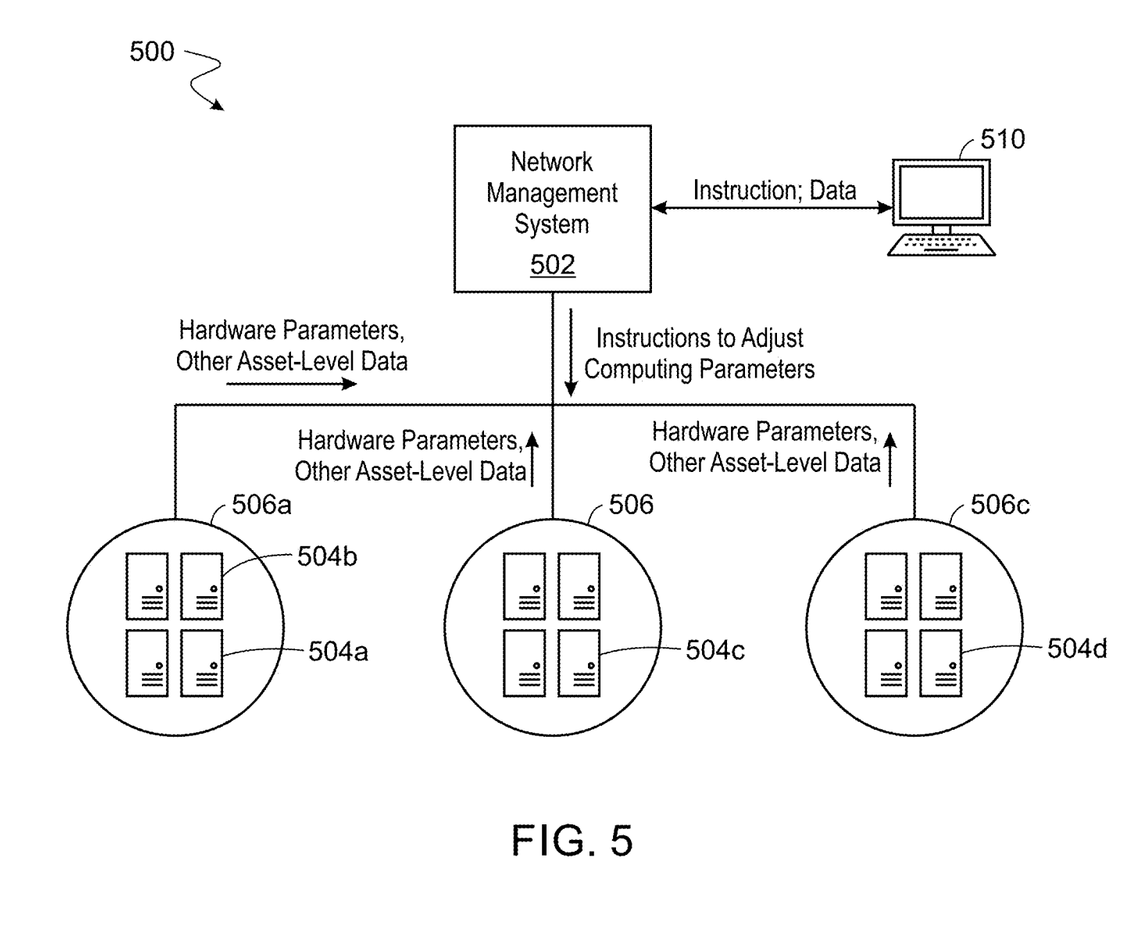
FIG. 5 shows a schematic diagram of a cryptomining system including a cryptographic hardware asset and a network management system.

FIG. 5 shows a schematic diagram of a cryptomining system 500 including a network management system 502 that controls operation of the cryptographic hardware assets, which can be monitored and benefit from a digital map of this disclosure. The network management system 502 can be a computing system such as a cloud computing system, e.g., including one or more computers, servers, storage media, processors, etc., in one or more locations. The network management system 502 can be configured to perform operations, e.g., based on including computer-readable media storing instructions that, when executed, cause processor(s) of the network management system 502 to perform the operations.

In some implementations, the network management system 502 includes or is an asset management server, sometimes referred to as a Fleet Management Console (FMC), that can be a dedicated hardware device or data center in a central location, or a cloud server dispersed over one or more locations. The server is configured to transmit and receive data to and from cryptographic hardware assets 504 in the cryptomining system 500, which may be housed in multiple different data centers, to perform individual or group-based asset control. In general, the asset management server can manage any number of cryptographic hardware assets, e.g., one thousand, ten thousand, one hundred thousand, one million, or more assets.

As illustrated in FIG. 5, the cryptomining system 500 can further include multiple sets 506a, 506b, 506c (referred to collectively as sets 506) of cryptographic hardware assets, such as cryptographic hardware assets 504a, 504b, 504c, 504d (referred to collectively as cryptographic hardware assets 504).

In various implementations, the cryptographic hardware assets 504 corresponds to the computation hardware assets described above referring to FIG. 1. The cryptographic hardware asset 504 can include one or more hashboards with numerous IC chips, where the hashboards correspond to the circuit board 100 of FIG. 1.

The cryptographic hardware assets 504 within each set 506 have one or more predetermined relationships with one another. For example, in some implementations, the cryptographic hardware assets 504 within each set 506 are co-located with one another, e.g., in a common facility or data center, such as a common cryptomining farm at a single location. For example, at least some of the sets 506 can be remote from one another, e.g., distributed across multiple facilities or data centers, which may be located in one or multiple geographic regions such as cities, state/provinces, and/or countries.

In some implementations, the cryptographic hardware assets 504 within each set 506 are associated with distinct entities, for example, are assigned to/controlled by distinct users, firms, etc. An entity can provide instructions for the configuration of the cryptographic hardware assets 504 in the set 506 assigned to the entity, and, in response, the network management system 502 can adjust computing parameters of the cryptographic hardware assets 504 in the set 506 and/or other cryptographic hardware assets 106, as discussed in further detail below.

The cryptographic hardware assets 504 can be configured to perform cryptographic mining operations, e.g., a blockchain mining process. For example, the cryptographic hardware assets 504 can be deployed as computational nodes in a cryptomining computer network for applications that rely on blockchain mining, e.g., for cryptocurrency mining, maintaining linked records of digital transactions, etc. In this context, a blockchain is a decentralized and distributed digital ledger that records units of information, e.g., transactions, across multiple computers or nodes. In a blockchain, transactions are grouped into blocks and added to a chain of previous blocks, forming a chronological sequence. Each block includes a hash value and a reference to the previous block, creating a linked structure. The blocks in the same blockchain are linked by having their hash values inserted into a designated field, e.g., a block header, in the next sequential block in the blockchain. A process of blockchain mining is designed to allow a blockchain system to reach a consensus in which all computational nodes in the blockchain system agree to a same blockchain. An example of a mining process by a computational node of a blockchain system can include computing (e.g., based on hash calculations) a valid proof-of-work for a block candidate that will be added to a blockchain. Based on the proof-of-work, cryptocurrency can be assigned to one or more wallets associated with the cryptographic hardware assets 504. The cryptographic hardware assets 504 can be configured to perform mining operations for one or more cryptocurrencies, e.g., Bitcoin, Ether, Monero, Litecoin, and/or other cryptocurrencies.

In various implementations, the cryptographic hardware asset 504 include additional circuitry such as an oscillator to synchronize the IC chips with a clock signal. In some implementations, each cryptographic hardware asset 504 is configured as a discrete unit separate from other cryptographic hardware assets 504, e.g., included in a corresponding enclosure and/or having one or more corresponding cooling devices. For example, each cryptographic hardware asset 504 can include one or more integrated circuits in a respective computer case or chassis. In some cases, each cryptographic hardware asset 504 can be referred to as a "miner."

The network management system 502 can be (though need not be) remote from one or more of the sets 506 of cryptographic hardware assets, and can be communicatively coupled to the sets 506 by one or more networks, such as the Internet and/or internal system networks, e.g., one or more local area networks (LAN). The network management system 502 can use the one or more networks to send data to the cryptographic hardware assets 504 to control the cryptographic hardware assets 504, and can receive data (such as hardware parameters) from the cryptographic hardware assets 504 through the one or more networks.

The cryptomining system 500 further includes a user device 510. The user device 510 can be configured to present a user interface that communicates with the network management system 502 via an application programming interface (API). For example, the user interface can provide real-time data to help users make decisions regarding mining configurations, and can provide user controls that allow users to input aggregate operational parameters for the cryptographic hardware assets 504.

The user device 510 can include any interactive computer device, such as a smartphone, a desktop computer, a laptop computer, a tablet, a virtual reality (VR) and/or augmented reality (AR) device, a wearable device, etc. In some implementations, the user interface is provided at the user device 510 from the network management system 502, e.g., by servers of the network management system. For example, the user device 510 can access a webpage or application to be provided with the user interface by the network management system 502.

Figure 6:
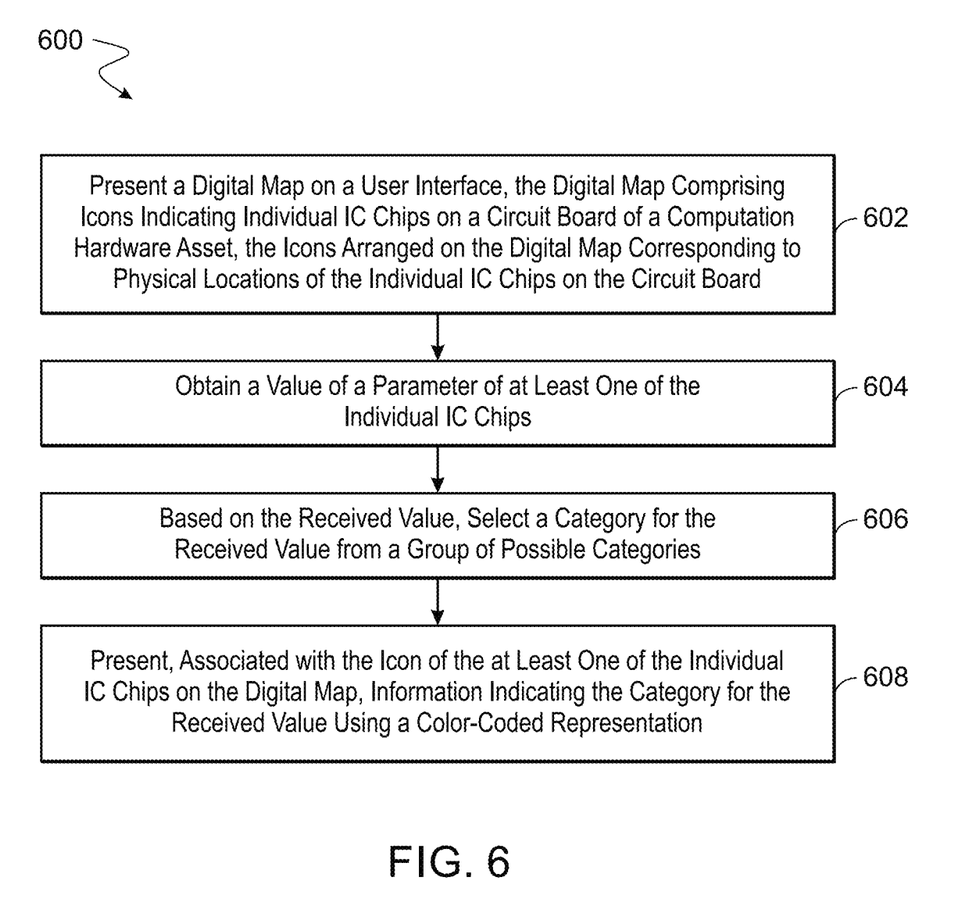
FIG. 6 shows a process flow diagram of an example method of presenting a digital map of a circuit board of a computation hardware asset.

FIG. 6 illustrates a process flow diagram of an example method of presenting a digital map of a circuit board of a computation hardware asset. FIG. 6 is merely for example, and in various implementations, the process can include additional process steps or omit some steps. Further, the order of the steps can be varied. In FIG. 6, a process 600 can start with a step 602 of presenting a digital map on a user interface. The digital map includes icons indicating individual IC chips on a circuit board of a computation hardware asset configured to perform computation tasks. In some implementations, the computation hardware asset is a cryptographic hardware asset for cryptocurrency mining operations. Further, the icons are arranged on the digital map corresponding to physical locations of the individual IC chips on the circuit board. At a step 604, a value of a parameter of at least one of the individual IC chips is obtained. At a step 606, based on the received value, a category for the received value is selected from a group of possible categories. The group of possible categories can indicate the health condition of the parameter (e.g., normal, warning, and abnormal). At a step 608, information indicating the category for the received value is presented using a color-coded representation. The information is presented as associated with the icon of the at least one of the individual IC chips on the digital map, enabling easy identification of the corresponding IC chip by the user.

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the cryptomining system 500 (e.g., the cryptographic hardware asset(s) 504, user device 510, network management system 502, etc.) can be implemented using digital electronic circuitry, or in computer software, firmware, or hardware, or in combinations of one or more of them. As another example, the process 600 shown in FIG. 6 can be implemented using digital electronic circuitry, or in computer software, firmware, or hardware, or in combinations of one or more of them.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

What is claimed is:

1. A system comprising:
   a control system communicatively coupled to at least one computation hardware asset through one or more networks, wherein the control system is configured to perform operations comprising:
      presenting on a user interface, a digital map comprising icons indicating individual integrated circuit (IC) chips on a circuit board of the computation hardware asset, the icons arranged in a grid layout having rows and columns on the digital map corresponding to physical locations of the individual IC chips on the circuit board;
      receiving a value of a parameter of at least one IC chip of the individual IC chips via the one or more networks;
      based on the received value, selecting a category for the received value from a group of possible categories, the category indicative of a health condition corresponding to the parameter for the at least one IC chip;
      presenting, associated with the icon of the at least one IC chip on the digital map, information indicating the category for the received value.

2. The system of claim 1, wherein the at least one computation hardware asset is configured to perform cryptocurrency mining operations.

3. The system of claim 1, wherein the information is presented using a color-coded representation, and each of the possible categories has a designated color code.

4. The system of claim 1, wherein the control system is further configured to adjust the parameter for the at least one of the individual IC chips based on the information presented on the digital map, during a computation performed by the at least one computation hardware asset.

5. The system of claim 1, wherein the parameter is a first parameter, and the control system is further configured to perform operations comprising:
   receiving a value of a second parameter and a value of a third parameter of the at least one of the individual IC chips;
   based on the received value of the second parameter, selecting a category for the received value of the second parameter from a second group of possible categories;
   presenting, associated with the icon of the at least one of the individual IC chips on the digital map, information indicating the category for the received value of the second parameter;
   based on the received value of the third parameter, selecting a category for the received value of the third parameter from a third group of possible categories; and
   presenting, associated with the icon of the at least one of the individual IC chips on the digital map, information indicating the category for the received value of the third parameter.

6. The system of claim 5, wherein the first parameter is temperature, the second parameter is frequency at which the at least one of the individual IC chips is operated, and the third parameter is voltage that is applied to the at least one of the individual IC chips.

7. The system of claim 1, wherein the digital map comprises a hover tooltip to present, when a user hovers a cursor over one of the icons on the digital map, the received value of the parameter for the one of the individual IC chips corresponding to the selected icon.

8. The system of claim 1, wherein the category indicative of the health condition corresponding to the parameter for the at least one IC chip indicates whether the received value is within a normal range of operation.

9. A system comprising:
   cryptographic hardware assets configured to perform hashing operations, the cryptographic hardware assets comprising hashboards, at least one of the hashboards comprising Application-Specific Integrated Circuit chips (ASIC chips), and
   a control system remote from the cryptographic hardware assets and communicatively coupled to the cryptographic hardware assets through one or more networks, wherein the control system is configured to perform operations comprising:
      when a user selects one of the hashboards on a user interface, presenting on the user interface, a digital map comprising icons indicating the ASIC chips on the selected hashboard, the icons arranged in a grid layout having rows and columns on the digital map corresponding to physical locations of the ASIC chips on the hashboard;
      receiving values of at least three parameters of at least one of the ASIC chips of the selected hashboard of the cryptographic hardware assets via the one or more networks;
      based on the received values, selecting a category for each of the received values from groups of possible categories, the category indicative of a health condition corresponding to each of the at least three parameters;
      presenting, associated with the icon of the at least one of the ASIC chips on the digital map, information indicating the categories for the received values.

10. The system of claim 9, wherein the at least three parameters comprise temperature, frequency, and voltage.

11. The system of claim 10, wherein the at least three parameters further comprise chip efficiency calculated based on the temperature, the frequency, and the voltage.

12. The system of claim 9, wherein each of the ASIC chips has a unique ID, and each of the icons presents the unique identifications (ID) of the corresponding ASIC chip.

13. The system of claim 9, wherein at least the one of the hashboards comprises at least 100 ASIC chips.

14. The system of claim 9, wherein the information is presented individually for each of the at least three parameters.

15. The system of claim 9, wherein the information is presented using color-coded representations, where each one of the possible categories has a designated color code within the corresponding group.

16. A method comprising:
   presenting a digital map on a user interface, the digital map comprising icons indicating individual integrated circuit (IC) chips on a circuit board of a computation hardware asset, the icons arranged in a grid layout having rows and columns on the digital map corresponding to physical locations of the individual IC chips on the circuit board, wherein the computation hardware asset is configured to perform computation tasks;
   obtaining a value of a parameter of at least one IC chip of the individual IC chips;
   based on the received value, selecting a category for the received value from a group of possible categories, the category indicative of a health condition corresponding to the parameter for the at least one IC chip;
   presenting, associated with the icon of the at least one of the individual IC chips on the digital map, information indicating the category for the received value using a color-coded representation.

17. The method of claim 16, wherein the method is performed using a control system communicatively coupled to the computation hardware asset through one or more networks.

18. The of claim 16, wherein the computation hardware asset comprises a cryptographic hardware asset configured to perform cryptocurrency mining operations, and the method is performed during the cryptocurrency mining operations.

19. The method of claim 18, further comprising, during the cryptocurrency mining operations, adjusting the parameter for the at least one of the individual IC chips.

20. The method of claim 16, further comprising, when a user hovers a cursor over an icon on the digital map, displaying the received value of the parameter for one of the individual IC chips corresponding to the selected icon.

21. The method of claim 16, wherein the parameter is temperature, the method further comprising:

obtaining a value of frequency and a value of voltage, the frequency and the voltage being those of the at least one of the individual IC chips;

based on the received value of the frequency, selecting a category for the received value of the frequency from a second group of possible categories;

presenting, associated with the icon of the at least one of the individual IC chips on the digital map, information indicating the category for the received value of the frequency;

based on the received value of the voltage, selecting a category for the received value of the voltage from a third group of possible categories; and presenting, associated with the icon of the at least one of the individual IC chips on the digital map, information indicating the category for the received value of the voltage.

\* \* \* \* \*